United States Patent

Serrano

[15] 3,638,969
[45] Feb. 1, 1972

[54] FLUID CONTROLLED PIPE CONNECTOR

[72] Inventor: Francisco M. Serrano, Paris, France
[73] Assignee: Compagnie Francaise des Petroles Societe Anonyme, Paris, France
[22] Filed: Nov. 24, 1969
[21] Appl. No.: 879,475

[30] Foreign Application Priority Data

Nov. 22, 1968 France..................................174885

[52] U.S. Cl..............................285/18, 285/96, 285/338, 285/370
[51] Int. Cl.......................................................F16l 17/02
[58] Field of Search.............285/96, 106, 101, 102, DIG. 21, 285/18, 338, 346, 196

[56] References Cited

UNITED STATES PATENTS

| | | | |
|---|---|---|---|
| 1,529,607 | 3/1925 | Owen | 285/338 |
| 2,609,836 | 9/1952 | Knox | 285/DIG. 21 |
| 2,897,895 | 8/1959 | Ortloff | 285/DIG. 21 |
| 3,071,188 | 1/1963 | Raulins | 285/DIG. 21 |
| 3,098,525 | 7/1963 | Haeber | 285/DIG. 21 |
| 3,147,992 | 9/1964 | Haeber et al. | 285/DIG. 21 |
| 3,163,223 | 12/1964 | Bauer et al. | 285/DIG. 21 |
| 3,436,084 | 4/1969 | Courter | 285/338 |

Primary Examiner—Thomas F. Callaghan
Attorney—Sughrue, Rothwell, Mion, Zinn & Macpeak

[57] ABSTRACT

A fluid controlled pipe connector which is capable of providing a removable connection between two adjoining pipe lengths regardless of their respective sizes. The connector utilizes a series of wedges that are activated in a gripping or non-gripping position by motive fluid introduced into the appropriate orifice of the connector. Various sealing members are positioned between the connector and the pipes to provide a fluidtight connection.

11 Claims, 4 Drawing Figures

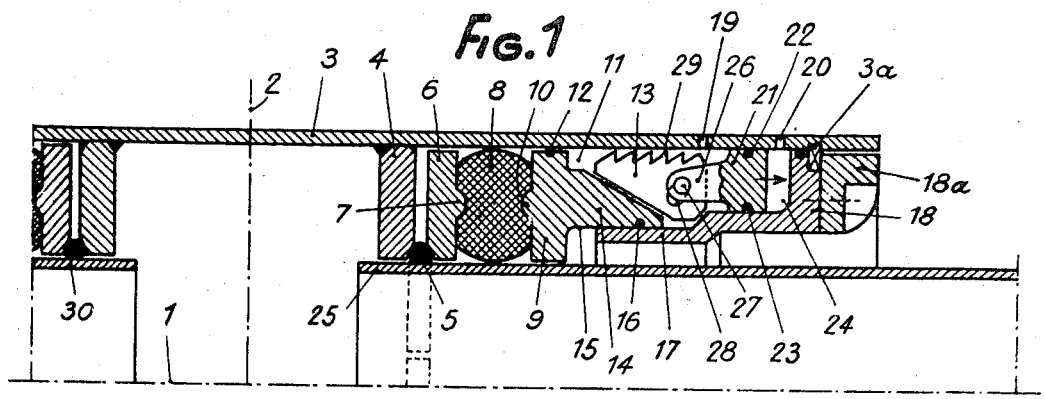
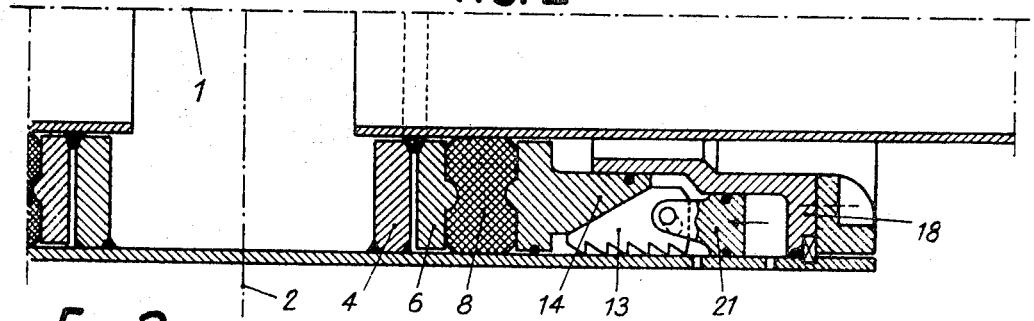
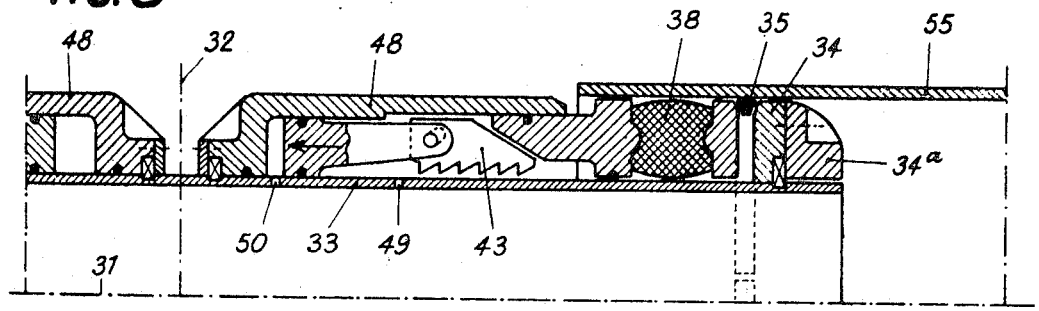
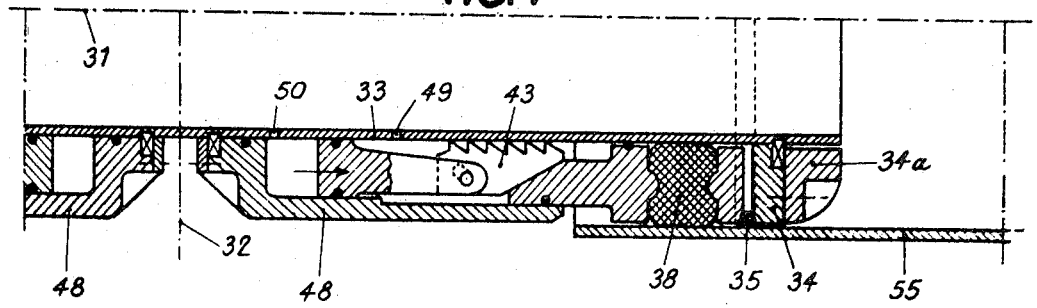

FLUID CONTROLLED PIPE CONNECTOR

This invention relates to a device for connecting pipes of various dimensions and especially pipes that are liable to have ends whose edges do not constitute a straight or inclined cross section and whose axes may be at an angle to each other.

There are many devices for linking pipes together, for example, flanges mounted on the ends of the pipes fastened by bolts or similar means. Often the process requires welding of the flanges and the corresponding delicate manipulation of the pipes which must be moved toward each other until the flanges are in contact.

It is often possible to avoid the use of flanges and to directly link the pipes by welding. But in this case the pipes will no longer be capable of dismantling and, as in the preceding process, it is necessary to make precise cuts to separate the pipes.

Other devices for linking include threaded sleeves or halfshells bolted or welded together; but these devices require precise alignment and in all cases lengthy and often delicate manual handling is required.

The object of this invention consists in providing a pipe linking connector that does not require the ends of the pipes that are to be linked to be level, nor precisely aligned. This pipe connector is characterized by the following elements: a tube and at least one stop in the form of a crown attached to the tube, a mobile crown in the tube, and an elastic tightening joint in the form of a crown, situated between the fixed and the mobile crowns, as well as a mechanism for the control of the movement of the mobile crown toward the elastic sealing joint.

By way of example, if it is desired to link the ends of any two small-diameter pipe elements, each of the ends to be linked will be placed inside of the linking connector tube having a larger diameter, the sole condition to be met will be that each of the ends must penetrate until they contact the internal part of the sealing joints. Thus, the pipes to be linked are no longer, as in the prior art devices, required to be individually manipulated or to be permanently affixed to each other.

Another object of the invention is to provide a connector of the type indicated, capable of being attached to the ends of tubes and to be linked solely due to the resilient control of the sealing joints, a crown-shaped stop having a chamfer along its periphery is provided opposite the wall of the tube to which it is attached. The connector further includes a mobile crown and a segment having a circular form with a trapezoidal cross section. The segment is elastic and is provided with a cut along one cross section, the segment being applied laterally against the chamfer of the stop of the connector by the mobile crown which is acted upon by the mechanism for controlling the compression (placement under compression) of the elastic joint. The segment is ultimately wedged between the stop, mobile crown, and the pipe to be linked.

In this manner, we not only attain a fluid tightness in the connection, but we also provide a positive linking of two pipes.

The connection of the pipe ends and the compression of the sealing joint is accomplished by providing a chamber for receiving a source of fluid to activate at least one plunger carrying a wedge for gripping the connector wall. The wedge rides on the oblique surface of a projection from a mobile crown member. Another mobile crown member is situated after a sealing rubber joint. Finally, a rubber jacket of a trapezoidal cross section is positioned between the second mobile crown member and a fixed crown or seat. Upon activation of the plunger, the jacket and sealing rubber joint are compressed to both seal and fasten the pipe connector to the pipe. Appropriate placed orifices provide access for introducing the motive fluid for both a locking and unlocking motion.

Other objects and features of this invention will emerge from the following specification, with reference to the attached drawing which, by way of example, illustrates two principal versions.

In the drawing:

FIG. 1 is an elevation view of the upper half-section of the linking connector before application of the motive fluid.

FIG. 2 is an elevation view of the lower half-section of the connector in a locked position.

FIG. 3 is an elevation view of the upper half-section of a modified unlocked connector of this invention.

FIG. 4 is an elevation view of the lower half-section of the locked modified connector of FIG. 3.

The devices, as illustrated in the figures, are symmetrical with respect to their respective axes and the elements being identical are not repeated. In this example, the linking connector is tube 3.

Connector 3 has a crown 4, attached to tube 3 by welding. This crown 4 has a chamfer cooperating with trapezoidal cross section segment 5. Mobile crown 6 has a corresponding chamfer on the other side of segment 5. Crown 6 has a flange 7 which is driven into rubber joint 8. A crown 9, likewise having a flange 10, directly rests on rubber joint 8 and slides against inside tube wall 3, guaranteeing tightness between chamber 11 and joint 8 by means of a toric joint 12. This crown 9 cooperates with a series of wedges 13 by means of an extension 14 whose cylindrical surface 15 involves a toric joint 16, guaranteeing the tightness of chamber 11, when surface 15 glides on cylinder 17 of member 18. Member 18 is rigidly attached to tube 3. Between orifices 19 and 20 of tube 3 there is a crown 21 which glides between the inside wall of tube 3 and member 18, toric joints 22 and 23 assuring tightness between chambers 11 and 24.

Crown 21 has arms 26, in a number equal to the number of wedges 13 and cooperating with the latter by lugs 27, penetrating into holes 28.

After introducing the end of tube 25 beyond crown 4, it suffices to inject a pressurized fluid through orifice 20 in order to displace, toward the left, the wedges 13, the crown 9, the joint 8, and the crown 6. At the end of the movement, these pieces assume the positions shown in FIG. 2. Segment 5 is positioned against the outside wall of pipe 25 and becomes wedged between the chamfer of crown 4 and the pipe 25. Wedge 13, gliding on extension 14 of crown 9, being guided by the edges of hole 28, sliding on lug 27, is supported by its teeth 29 against the inside wall of tube 3.

After attachment of connector 3 to pipe 25, we can proceed by identical mechanisms not disclosed in the drawing to the attachment of pipe 30 to connector 3. The control of locking the connector to the pipes is capable of being accomplished simultaneously.

When it is desired to remove the pipe connector a pressurized fluid can be introduced through orifice 19 into sealed cavity 11. The pressure thus exerted recompresses the joint 8 by a slight displacement of crown 9, the ring-shaped area of crown 9 being larger than the ring-shaped surface of crown 21. Furthermore, due to this pressure, crown 21 moves to the right, and the combination of these two movements disengages wedges 13. When the pressure is relaxed, the various pieces return to their original position, joint 8 resumes its normal volume and permits the expansion of segment 5, thus completely releasing pipe 25.

It is obvious that a pipe connector of this type may come in different forms. Instead of being symmetrical with respect to axis 2, the device may include only the mechanism shown to the right of this axis, the left portion being welded to duct 30 or to a duct with a different cross section.

In the examples shown in FIGS. 3 and 4, we have assumed that the pipes to be linked had a larger cross section than the connector and in order to facilitate the reading of the drawing, similar pieces have been labeled with numerical references whose number differs from that of the designated element in FIGS. 1 and 2 by the addition of the number 30.

As in the preceding example, the connector 33 is symmetrical with respect to axes 31 and 32. However, the elements between stop 34 (corresponding to stop 4 in FIG. 1) and piece 48 (corresponding to piece 18 of FIG. 1), outside the connector 33, has the effect of causing orifices 49 and 50 to open into the interior of tube 33. This arrangement may be advantageous in certain projects, especially in drilling. We understand, however, that we would not be going beyond the framework of the invention if we were to replace orifices 49 and 50 with orifices in element 48 and providing access, as in the preceding example, on the outside.

Likewise, numerous other modifications could be made in the examples shown. For instance, when the pressure of the liquids circulating in the pipes are large, one can use several segments such as 5. Members 18a, in FIG. 1, facilitate the introduction of the pipes to be linked while members 34a facilitate the introduction of the connector; these members can just as well be mounted on the pieces supporting the assembly of locking wedges which, on the stopping crowns, arrest the attachment segments. It is clear that the mounting of these pieces may be of any form. For example, the positioning of piece 18, in FIG. 1, with respect to tube 3, may be accomplished with the help of a conventional assembly, such as springs resting in groove 3a, piece 18 remaining blocked against the spring or two half-rings when piece 18a is attached, by screw, for example, on piece 18.

What is claimed is:

1. A pipe connector for linking two separate pipes comprising a housing, connection means at both ends of the housing each including a seating means extending from the housing;
   a mobile crown;
   elastic resilient sealing means between the seating means and the mobile crown for providing a releasable seal directly between a pipe and the housing; and
   means for controlling the movement of the mobile crown toward and away from the elastic resilient sealing means for respectively locking and releasing the pipe connector, said controlling means includes a hydraulic piston and a locking means on the piston capable of holding the mobile crown and the elastic resilient sealing means in a locked position by engaging the housing.

2. A pipe connector as in claim 1 where the locking means is a wedge-shaped member attached to the hydraulic piston, and the mobile crown includes an inclined surface capable of operatively moving the wedged shaped member into a locking position.

3. A pipe connector as in claim 3 further including a second mobile crown between the elastic sealing means and the seating means, and a resilient member located between the seating means and the second mobile crown.

4. A pipe connector as in claim 3 where the resilient member has a trapezoidal cross section, and the seating means and the second mobile crown have chamfer edges adjacent the resilient member.

5. A pipe connector as in claim 3 where the first and second mobile crowns have a flange that contacts the elastic sealing means.

6. A pipe connector as in claim 4 having a pair of orifices in the housing each operatively connected to one side of the hydraulic piston; the mobile crown and the side of the piston connected to the locking means forming a hydraulic chamber capable of receiving a hydraulic working fluid for providing a compression of the elastic sealing means and the activation of the locking means.

7. A pipe connector as in claim 2 where the housing has a larger diameter than the pipes to be linked and the wedge-shaped member frictionally grips the interior side of the housing.

8. A pipe connector as in claim 2 where the housing has a smaller diameter than the pipes to be linked and the wedge-shaped member frictionally grips the exterior of the housing.

9. A pipe connector for linking a pair of pipes, each having a plane surface comprising;
   a housing;
   a seating means extending from the housing;
   a resilient deformable sealing means positioned adjacent the seating means and capable of sealingly contacting the housing and pipe surface;
   a movable ring member positioned adjacent the sealing means and having a camming surface on its side opposite the sealing means;
   hydraulic cylinder means;
   a hydraulic piston in the cylinder means and capable of reciprocal movement along the axis of the housing, movement toward the sealing means producing a locking engagement while movement away from the sealing means producing a releasing action;
   a locking member having a complimentary camming surface to the camming surface of the movable ring member connected to the hydraulic piston whereby the movement of the hydraulic piston towards the seating means will produce both a sealing and a simultaneous camming of the locking member into a locking engagement with the housing.

10. A pipe connector as in claim 9 where the connection of the locking member to the hydraulic piston includes a lost motion connection to facilitate both locking and unlocking of the pipe connector to the pipes.

11. A pipe connector as in claim 10, where a second ring is provided between the seating means and the sealing means, the second ring having an abutting central flange adjacent the sealing means to help position the sealing means into a sealed position with the pipe connector and pipe.

* * * * *